United States Patent
Ono (10) Patent No.: US 10,201,867 B2
(45) Date of Patent: Feb. 12, 2019

(54) THROUGH-HOLE FORMING METHOD, THROUGH-HOLE FORMING APPARATUS, AND METHOD OF MANUFACTURING GLASS SUBSTRATE PROVIDED WITH THROUGH-HOLE

(71) Applicant: AGC Inc., Chiyoda-ku (JP)

(72) Inventor: Motoshi Ono, Chiyoda-Ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 14/965,111

(22) Filed: Dec. 10, 2015

(65) Prior Publication Data

US 2016/0168006 A1 Jun. 16, 2016

(30) Foreign Application Priority Data

Dec. 16, 2014 (JP) ................................. 2014-254424

(51) Int. Cl.
*C03B 33/10* (2006.01)
*C03C 23/00* (2006.01)
(Continued)

(52) U.S. Cl.
CPC ............ *B23K 9/013* (2013.01); *B23K 26/382* (2015.10); *B23K 26/384* (2015.10); *B26F 1/28* (2013.01);
(Continued)

(58) Field of Classification Search
CPC ... B23K 26/382; B23K 26/384; B23K 26/389
See application file for complete search history.

(56) References Cited

U.S. PATENT DOCUMENTS

2001/0009251 A1 7/2001 Sekizawa et al.
2002/0153361 A1* 10/2002 Sakamoto .......... B23K 26/0608
219/121.73
(Continued)

FOREIGN PATENT DOCUMENTS

JP 5-330064 12/1993
JP 10-263873 10/1998
(Continued)

OTHER PUBLICATIONS

Ekmekci (Ekmekci, B., Sayar, A., Opoz, T.T., Erden, A., "Geometry and surface damage in microelectrical discharge machining of micro-holes", Jounal of Micromechanics and Microengineering, vol. 19, No. 10, (2009)).*

(Continued)

*Primary Examiner* — Jason L Lazorcik
(74) *Attorney, Agent, or Firm* — Oblon, McClelland, Maier & Neustadt, L.L.P.

(57) ABSTRACT

Disclosed is a through-hole forming method including a process of forming, by condensing and irradiating a laser beam onto an insulation substrate through a lens, a through-hole that passes through the insulation substrate in a thickness direction of the insulation substrate. A medium between the lens and the insulation substrate is air. A converging half angle θ that is calculated from a focal length f of the lens and a beam diameter d of the laser beam that enters the lens by using expression (1) satisfies expression (2):

$(d/2)/f = \tan\theta$ (1), and $0.16 \leq \sin\theta \leq 0.22$ (2).

14 Claims, 10 Drawing Sheets

(51) Int. Cl.
*B23K 9/013* (2006.01)
*B23K 26/382* (2014.01)
*B26F 1/28* (2006.01)
*B23K 26/384* (2014.01)
*B23K 103/00* (2006.01)

(52) U.S. Cl.
CPC ...... *B23K 2103/50* (2018.08); *B23K 2103/54* (2018.08)

(56) References Cited

U.S. PATENT DOCUMENTS

| | | | |
|---|---|---|---|
| 2004/0102764 A1* | 5/2004 | Balling | A61F 9/008 606/5 |
| 2004/0188393 A1* | 9/2004 | Li | B23K 26/04 219/121.7 |
| 2005/0006359 A1 | 1/2005 | Blakey | |
| 2005/0064137 A1* | 3/2005 | Hunt | B23K 26/006 428/131 |
| 2005/0155956 A1* | 7/2005 | Hamada | B23K 26/0626 219/121.69 |
| 2013/0247615 A1* | 9/2013 | Boek | C03C 15/00 65/29.1 |
| 2015/0259235 A1* | 9/2015 | Takeda | C03B 33/0222 65/112 |
| 2016/0059359 A1* | 3/2016 | Krueger | B23K 26/0057 65/29.1 |

FOREIGN PATENT DOCUMENTS

| | | |
|---|---|---|
| JP | 2001-269789 | 10/2001 |
| JP | 2002-28799 | 1/2002 |
| JP | 2005-503266 A | 2/2005 |
| JP | 2008-284579 | 11/2008 |
| JP | 2010-42424 | 2/2010 |
| JP | 2011-177735 | 9/2011 |
| JP | 2013-241301 | 12/2013 |
| JP | 2014-501686 | 1/2014 |
| JP | 2014-213338 | 11/2014 |
| JP | 2014-226710 | 12/2014 |

OTHER PUBLICATIONS

Rocoes, Corning Glass: material properties of Corning EAGLE 2000 and EAGLE XG glass (http://rocoes.com.tw/2008e/glass/corning.htm) Accessed Mar. 28, 2018.*

* cited by examiner

THROUGH-HOLE FORMING METHOD, THROUGH-HOLE FORMING APPARATUS, AND METHOD OF MANUFACTURING GLASS SUBSTRATE PROVIDED WITH THROUGH-HOLE

CROSS-REFERENCE TO RELATED APPLICATION

The present application is based on and claims the benefit of priority of Japanese Priority Application No. 2014-254424 filed on Dec. 16, 2014, the entire contents of which are hereby incorporated by reference.

BACKGROUND OF THE INVENTION

1. Field of the Invention

The present invention relates to a through-hole forming method, a through-hole forming apparatus, and a method of manufacturing a glass substrate provided with a through-hole.

2. Description of the Related Art

A through-hole forming method has been known such that, by irradiating a laser beam onto a glass substrate, a through-hole can be formed that passes through the glass substrate in a thickness direction of the substrate (cf. Patent Document 1, for example).

PATENT DOCUMENT

[Patent Document 1] PCT Japanese Translation Patent Publication No. 2014-501686

SUMMARY OF THE INVENTION

For a case of forming a through-hole by irradiating a laser beam, a shape of the formed through-hole may be significantly deviated from a target shape.

The present invention has been developed in view of the above-described point. There is a need for a through-hole forming method, a through-hole forming apparatus, and a method of manufacturing a glass substrate provided with a through-hole that can suppress collapse in a shape of a through-hole (e.g., a protrusion or a narrow part).

According to an aspect of the present invention, there is provided a through-hole forming method including a process of forming, by condensing and irradiating a laser beam onto an insulation substrate through a lens, a through-hole that passes through the insulation substrate in a thickness direction of the insulation substrate, wherein a medium between the lens and the insulation substrate is air, and wherein a converging half angle θ that is calculated from a focal length f of the lens and a beam diameter d of the laser beam that enters the lens by using expression (1) satisfies expression (2):

$$(d/2)/f = \tan \theta \quad (1), \text{ and}$$

$$0.16 \leq \sin \theta \leq 0.22 \quad (2).$$

According to another aspect of the present invention, there is provided a through-hole forming apparatus configured to form a through-hole that passes through an insulation substrate in a thickness direction of the insulation substrate by condensing and irradiating a laser beam onto the insulation substrate through a lens, the through-hole forming apparatus including a laser source configured to emit the laser beam; and an optical system configured to condense the laser beam from the laser source and configured to irradiate the condensed laser beam onto the insulation substrate, wherein the optical system includes the lens, wherein a medium between the lens and the insulation substrate is air, and wherein a converging half angle θ that is calculated from a focal length f of the lens and a beam diameter d of the laser beam that enters the lens by using expression (1) satisfies expression (2):

$$(d/2)/f = \tan \theta \quad (1), \text{ and}$$

$$0.16 \leq \sin \theta \leq 0.22 \quad (2).$$

According to another aspect of the present invention, there is provided a method of manufacturing a glass substrate provided with a through-hole, the method including a process of forming, by condensing and irradiating a laser beam onto a glass substrate through a lens, a through-hole that passes through the glass substrate in a thickness direction of the glass substrate, wherein a medium between the lens and the glass substrate is air, and wherein a converging half angle θ that is calculated from a focal length f of the lens and a beam diameter d of the laser beam that enters the lens by using expression (1) satisfies expression (2):

$$(d/2)/f = \tan \theta \quad (1), \text{ and}$$

$$0.16 \leq \sin \theta \leq 0.22 \quad (2).$$

According to the embodiment of the present invention, a through-hole forming method, a through-hole forming apparatus, and a method of manufacturing a glass substrate provided with a through-hole can be provided that can suppress collapse in a shape of the through-hole.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Hereinafter, an embodiment of the present invention is described by referring to the accompanying drawings. In the figures, like reference numerals may be attached to similar components, and thereby duplicate description may be omitted. In the following description, "a range from x to y" is defined to be a numerical range that is greater than or equal to x and less than or equal to y (i.e., the numerical values "x" and "y" are included in the "range from x to y").

Figure 1:
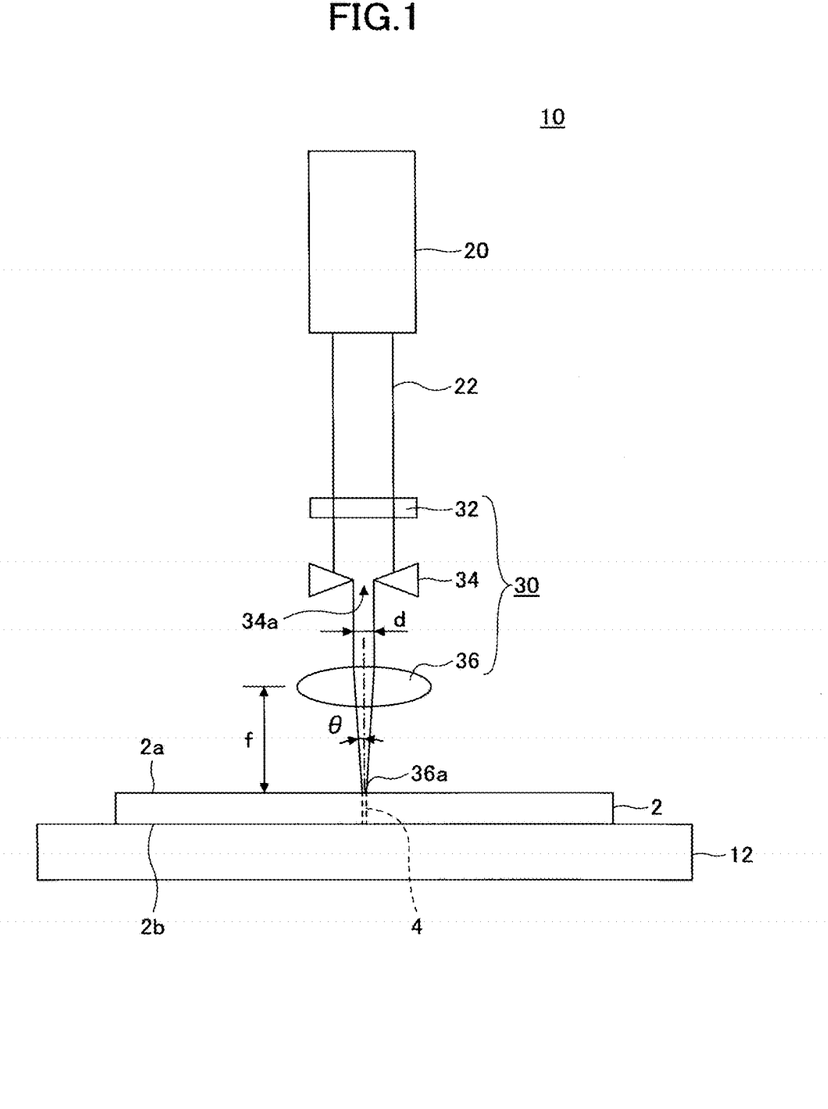
FIG. 1 is a diagram showing a through-hole forming apparatus according to an embodiment of the present invention.

FIG. 1 is a diagram showing a through-hole forming apparatus 10 according to an embodiment of the present invention. As shown in FIG. 1, the through-hole forming apparatus 10 may include a stage 12; a laser source 20; an optical system 30, and so forth.

The stage 12 can hold an insulation substrate 2. The insulation substrate 2 can be a glass substrate, for example. The glass substrate may be a glass substrate in which various types of functional films are formed, or a glass substrate on which a resin film or the like is laminated. Thickness of the glass substrate may be in a range from 0.05 mm to 0.7 mm, for example. The stage 12 can fix the insulation substrate 2 by suction. Alternatively, the stage 12 may fix the insulation substrate by adhesion. The suction may be vacuum suction or electrostatic suction, for example. The stage 12 may have a function to move the insulation substrate 2 in a horizontal direction. The stage 12 may be formed of an XY stage, for example.

The laser source 20 may be disposed at an opposite side of the stage 12 with respect to the insulation substrate 2. The laser source 20 can emit a laser beam 22. As the laser source 20, a carbon dioxide laser may be preferable. For a carbon dioxide laser, a cost for the device can be less expensive, and machining time for forming one through hole can be short. Additionally, because of the thermal process, for drilling with a carbon dioxide laser, an inner wall of a through hole to be formed can be smoother. In addition, as the laser source 20, a YAG laser and so forth can be used.

The optical system 30 can condense and irradiate the laser beam 22 from the laser source 20 onto the insulation substrate 2 that is held by the stage 12. The laser beam 22 may perpendicularly enter the insulation substrate 2. The optical system 30 may include, for example, a waveplate (retarder) 32; an aperture 34; a lens 36, and so forth.

The waveplate 32 can convert polarization of the laser beam 22 from linear polarization into circular polarization. The waveplate 32 may be formed of a quarter waveplate, for example. The waveplate 32 may be disposed between the laser source 20 and the aperture 34, for example. For a case of irradiating the circularly polarized laser beam 22 onto the insulation substrate 2, a cross-sectional shape of a through-hole 4 becomes more symmetric compared with a case in which the linearly polarized laser beam 22 is irradiated onto the insulation substrate 2. The waveplate 32 may be omitted. The optical system 30 may condense the linearly polarized laser beam 22, and the optical system 30 may irradiate the condensed linearly polarized laser beam 22 onto the insulation substrate 2.

The aperture 34 may have a small circular opening 34a that is smaller than a cross-section of the laser beam 22. The aperture 34 can enhance circularity of the cross-section of the laser beam 22 by blocking a peripheral portion of the cross-section of the laser beam 22. Additionally, the aperture 34 can vary a converging half angle θ by varying a diameter of an incident beam of the laser beam 22 with respect to the lens 36. The aperture 34 may be disposed between the waveplate 32 and the lens 36, so that the aperture 34 can adjust the cross-sectional shape of the laser beam 22 and/or the converging half angle θ, prior to the laser beam 22 entering the lens 36. Note that the aperture 34 can be omitted as long as the laser beam 22 that enters the lens 36 is collimating light having a circular cross-section.

The lens 36 can condense the laser beam 22, and the condensed laser beam 22 can be irradiated from the lens 36 onto the insulation substrate 2 that is held by the stage 12. As shown in FIG. 1, a focal point 36a of the lens 36 can be placed on a to-be-irradiated surface 2a (which may also be referred to as a laser irradiated surface 2a) of the insulation substrate 2, for example. Here, the to-be-irradiated surface 2a is to be irradiated by the laser beam 22. Alternatively, the focal point 36a may be placed in the vicinity of the to-be-irradiated surface 2a. For the case in which the focal point 36a is placed in the vicinity of the to-be-irradiated surface 2a, the focal point 36a of the lens 36 may be placed at a side of the laser source 20 or at a side that is opposite to the laser source 20, with respect to the laser irradiated surface 2a of the insulation substrate 2. A distance between the focal point 36a of the lens 36 and the laser irradiated surface 2a of the insulation substrate 2 in a direction that is perpendicular to the laser irradiated surface 2a may be less than or equal to 0.1 mm. By condensing the laser beam 22 and irradiating the condensed laser beam 22 onto the insulation substrate 2, the insulation substrate 2 can be locally heated, and the heated portion can be removed. In this manner, the through-hole 4 can be formed. The lens 36 can be disposed between the aperture 34 and the stage 12, for example.

Though it is not shown in the figures, in order to enlarge a beam diameter of the laser beam 22, a beam expander may be disposed between the laser source 20 and the waveplate 32.

Next, a through-hole forming method that uses the above-described through-hole forming apparatus 10 is described. The through-hole forming method may include a process of forming the through-hole 4 that passes through the insulation substrate 2 in the thickness direction of the insulation substrate 2 by condensing the laser beam 22 by the lens 36 and by irradiating the condensed laser beam 22 onto the insulation substrate 2 from the lens 36. In the above-described process of forming the through-hole 4, the insulation substrate 2 may be locally heated by irradiating the condensed laser beam 22, and the heated portion may be removed. In this manner, the through-hole 4 can be formed. After forming the through-hole 4, the relative position, in the horizontal direction, of the stage 12 may be changed with respect to the laser source 20 and the optical system 30, and another through-hole 4 may be formed. In this manner, more than one through-holes 4 can be formed in the insulation substrate 2.

Note that, for changing the relative position, in the horizontal direction, of the stage 12, with respect to the laser source 20 and the optical system 30, either the laser source 20 and the optical system 30 or the stage 12 may be moved. Alternatively, both the laser source 20 and the optical system 30, and the stage 12 may be moved.

Figure 2:
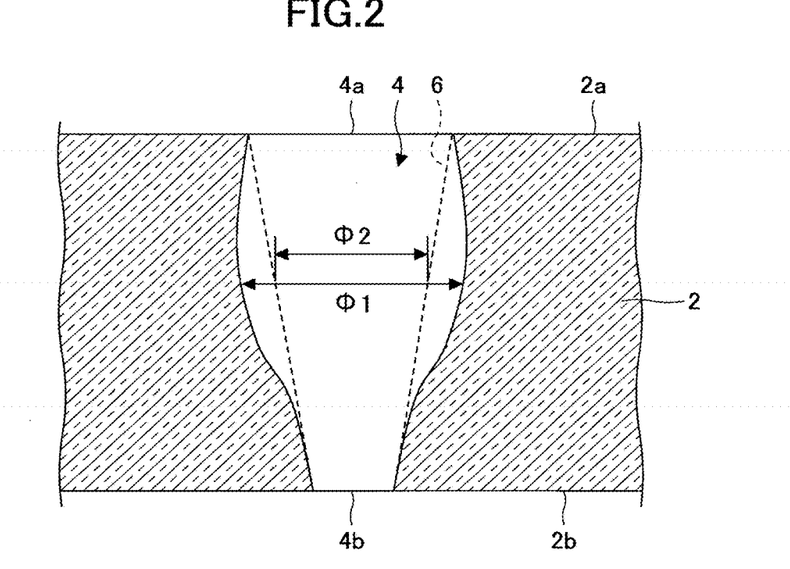
FIG. 2 is a diagram showing a vertical cross-section of a through-hole according to the embodiment of the present invention.

FIG. 2 is a diagram showing a vertical cross-section of the through-hole 4 according to the embodiment of the present invention. In FIG. 2, the dashed line shows a target shape of the through-hole 4. Note that, in FIG. 2, a deviation of the shape of the through-hole 4 from the target shape is exaggerated.

As shown in FIG. 2, the insulation substrate 2 is provided with the through-hole 4 that passes through the insulation substrate 2 in the thickness direction of the insulation substrate 2. The through-hole 4 may include a first orifice 4a that is formed at the laser irradiated surface 2a of the insulation substrate 2; and a second orifice 4b that is formed at a surface 2b (which may also be referred to as the opposite surface 2b, hereinafter) that is opposite to the laser irradiated surface 2a of the insulation substrate 2.

The through-hole 4 can be formed by digging the hole from the laser irradiated surface 2a toward the opposite surface 2b. Hereinafter, a hole that is to be a through-hole (prior to forming the through-hole) may be referred to as a bottomed hole (a hole with a bottom). The laser beam 22 that is irradiated onto the insulation substrate 2 can be roughly classified into the laser beam 22 that can reach a bottom of the bottomed hole and the laser beam 22 that may be absorbed by a side surface of the bottomed hole and that may not reach the bottom of the bottomed hole. Thus, the through-hole 4 can be formed such that a shape the through-hole 4 depends on strength balance of the laser beam 22.

Within the laser beam 22 that is absorbed by the side surface of the bottomed hole, a proportion of the laser beam 22b that is absorbed in the vicinity of the entrance may be large. Consequently, removal of the glass tends to progress in the vicinity of the entrance, so that the first orifice 4a can be greater than the second orifice 4b. In other words, the second orifice 4b can be smaller than the first orifice 4a.

A truncated cone 6 whose side surface includes the first orifice 4a and the second orifice 4b can be a target shape. Assuming that the medium between the lens 36 and the insulation substrate 2 is air and that the converging half angle is $\theta$ (cf. FIG. 1), the deviation from the target shape (which may also be referred to as "collapse in a shape," hereinafter) can correspond to sin $\theta$. Here, the converging half angle $\theta$ can be calculated from the expression (1), which is described below.

$$(d/2)/f = \tan\theta \quad (1)$$

In the above-described expression (1), "d" is a diameter of the incident beam of the laser beam 22 with respect to the lens 36, and "f" is a focal length of the lens 36.

Here, sin $\theta$ may correspond to the converging half angle of the laser beam 22.

Figure 3:
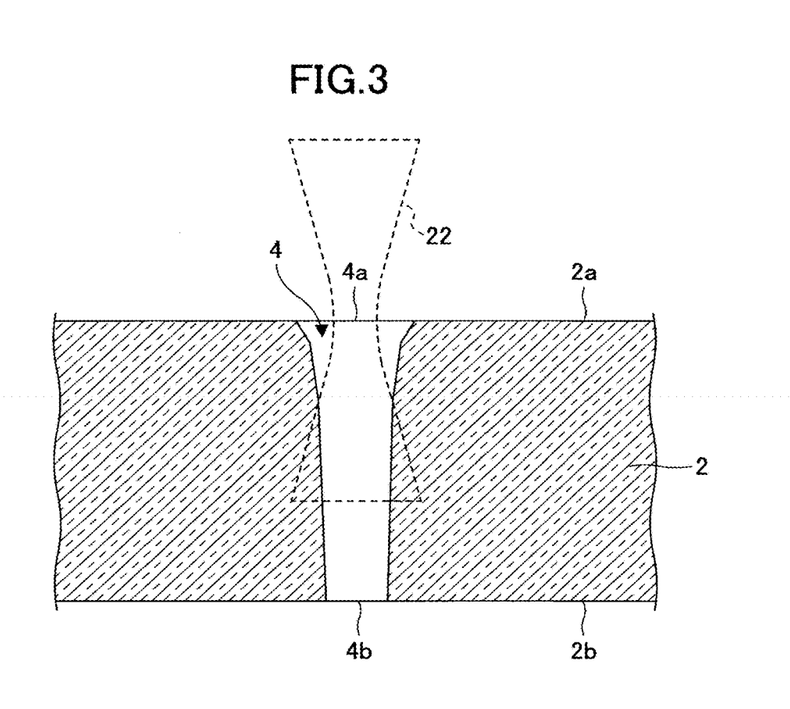
FIG. 3 is a diagram showing a shape of a through-hole according to the embodiment when sin θ is in a range from 0.16 to 0.22.
Figure 4:
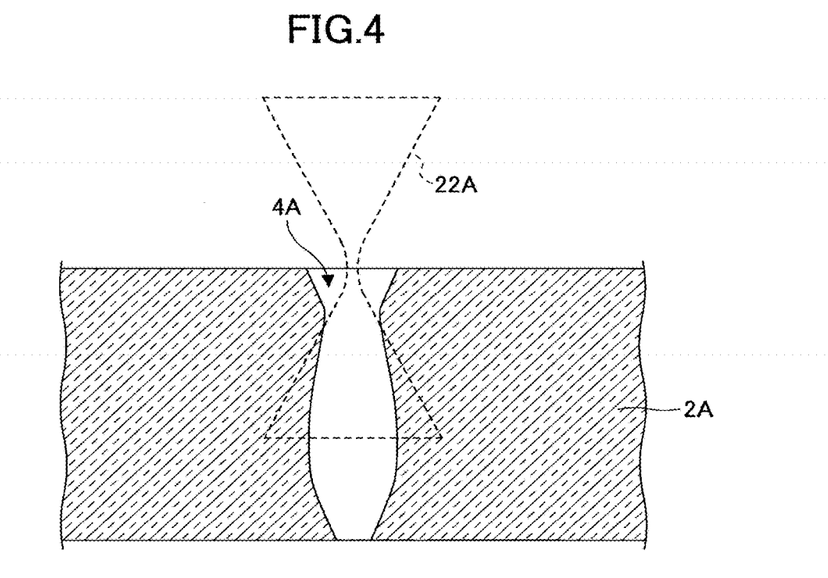
FIG. 4 is a diagram showing a shape of a through-hole according to a first comparative example when sin θ is greater than 0.22.
Figure 5:
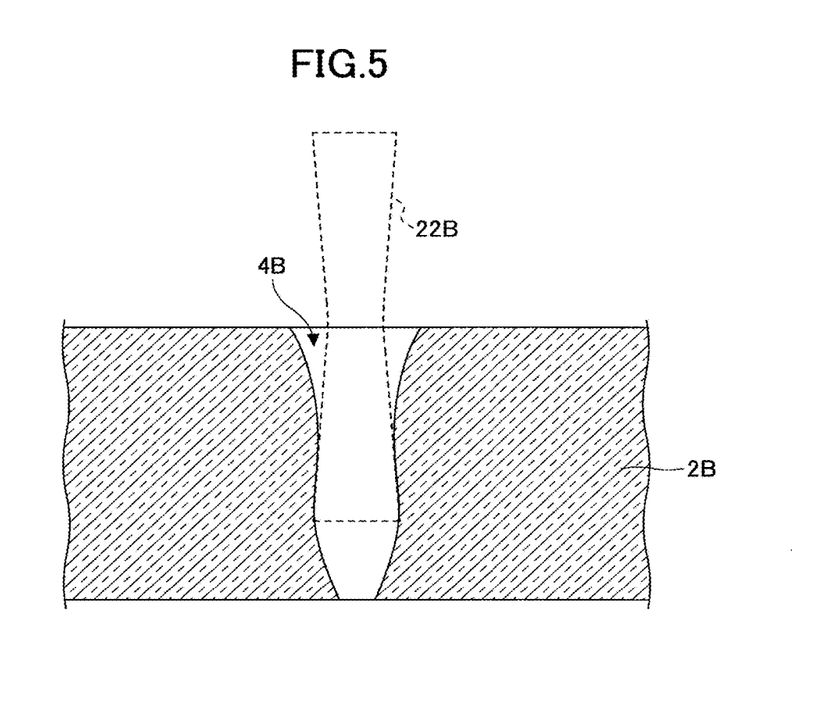
FIG. 5 is a diagram showing a shape of a through-hole according to a second comparative example when sin θ is less than 0.16.

FIG. 3 is a diagram showing a shape of the through-hole 4 according to the embodiment for a case in which sin $\theta$ is in a range from 0.16 to 0.22. FIG. 4 is a diagram showing a shape of a through-hole according to a first comparative example for a case in which sin $\theta$ is greater than 0.22. FIG. 5 is a diagram showing a shape of a through-hole according to a second comparative example for a case in which sin $\theta$ is less than 0.16.

In the first comparative example that is shown in FIG. 4, sin $\theta$ is greater than 0.22. In this case, the converging half angle may be too large, and a spread of a condensed laser beam 22A may be too large. Consequently, a proportion of the laser beam 22A that is absorbed in the side surface of the bottomed hole may be too large, and a through-hole 4A may have a barrel shape that expands in the vicinity of the center of the insulation substrate 2 in the thickness direction of the insulation substrate 2. Especially, for a carbon dioxide laser, absorption of a laser beam by glass is large, compared to that of the YAG laser. Consequently, for a carbon dioxide laser, a rate of the laser beam 22A that is absorbed in the side surface of the bottomed hole tends to be greater, and the collapse in the shape tends to be significant.

In the second comparative example that is shown in FIG. 5, sin $\theta$ is less than 0.16. In this case, a beam diameter (which may also be referred to as a spot diameter of the laser beam 22B) of the laser beam 22B at a focal point may be too large, and a first orifice that can be formed at a laser irradiated surface of an insulation substrate 2B may be too large. Further, in this case, a focal depth may be too large. As a result of these, the laser beam 22B tends to reach a bottom of the bottomed hole, and the proportion of the laser beam 22B that can be absorbed in the bottom of the bottomed hole may be too large. Consequently, expansion of the hole diameter of the bottom of the bottomed hole tends to progress, and the through-hole 4B may have a barrel shape.

In the embodiment that is shown in FIG. 3, sin $\theta$ is in a range from 0.16 to 0.22. Namely, the converging half angle $\theta$ satisfies the following expression (2):

$$0.16 \leq \sin\theta \leq 0.22 \quad (2)$$

In this case, the intensity of the laser beam 22 that reaches the bottom of the bottomed hole and the intensity of the laser beam 22 that is absorbed in the side surface of the bottomed hole and that does not reach the bottom surface of the bottomed hole are well-balanced. The shape of the through-hole 4 can be close to a linearly tapered shape, which is the target shape. Thus, the collapse in the shape of the through-hole 4 can be suppressed. In this manner, a ratio ($\Phi 1/\Phi 2$) between the diameter of the through-hole 4 ($\Phi 1$) and the diameter of the truncated cone 6 ($\Phi 2$) at any position of the through-hole 4 in the thickness direction of the insulation substrate 2 can be regulated to be within a range from 0.7 to 1.1. Here, sin $\theta$ can preferably be in a range from 0.17 to 0.21, and sin $\theta$ can be more preferably in a range from 0.18 to 0.20. For a case where a carbon dioxide laser is used such that absorption of the laser beam in the glass is large and a rate of absorption of the laser beam in the side surface of the bottomed hole tends to be large, if the above-described expression (2) is satisfied, an effect of suppressing the collapse in the shape can be significant.

An inflated part and/or a narrow part can be prevented from being formed in the through-hole 4 because the ratio ($\Phi 1/\Phi 2$) of the through-hole 4 at any position of the through-hole 4 in the thickness direction of the insulation substrate 2 can be within the range from 0.7 to 1.1. Thus, a through electrode can be formed such that the through-hole 4 has a shape that is close to a linearly tapered shape, and the through electrode has fewer defects. For example, for a case of forming a through electrode by plating, a base layer of the plating can be uniformly formed on a side surface of the through-hole 4. The base layer of the plating can be formed by a sputtering method, for example. A through electrode can be formed in which the growth of the plating can be uniform and which has fewer defects because the base layer of the plating can be uniformly formed. Additionally, for a case of forming a through electrode by an electrically conductive paste, filling shortage and filling unevenness of the electrically conductive paste can be suppressed. Thus, a through electrode having fewer defects can be formed. The insulation substrate 2 having a through electrode can be used as an interposer.

Figure 6:
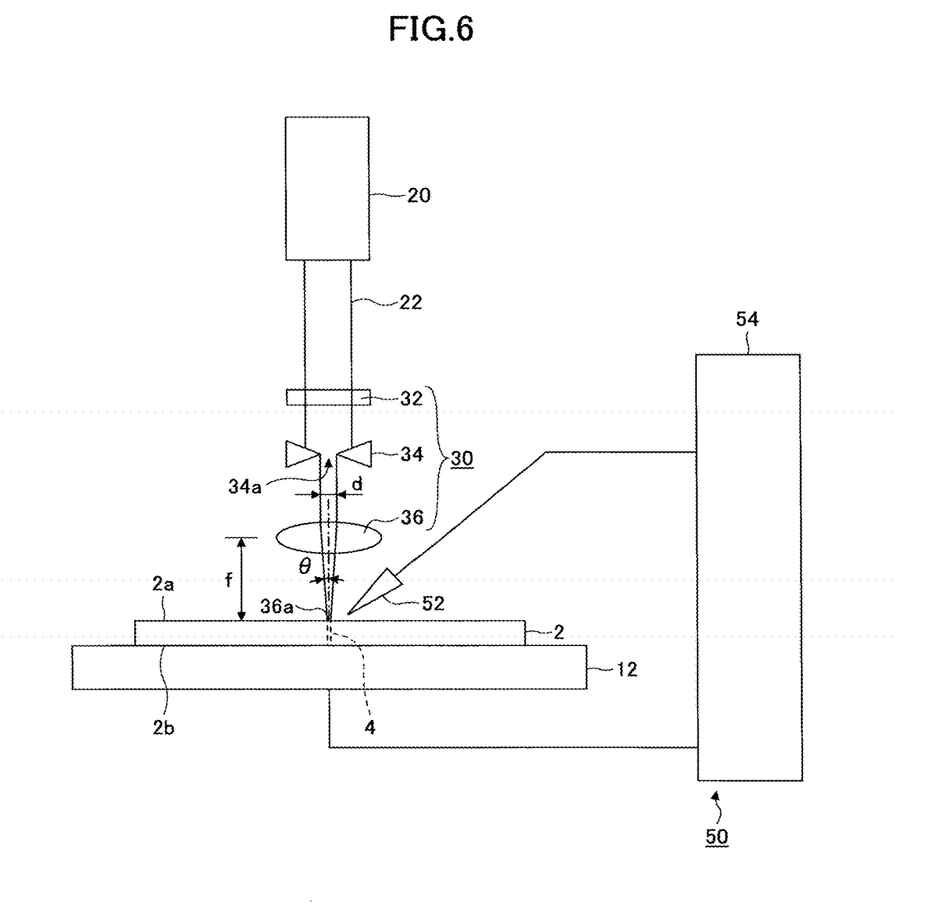
FIG. 6 is a diagram showing a through-hole forming apparatus according to another embodiment of the present invention.
Figure 7:
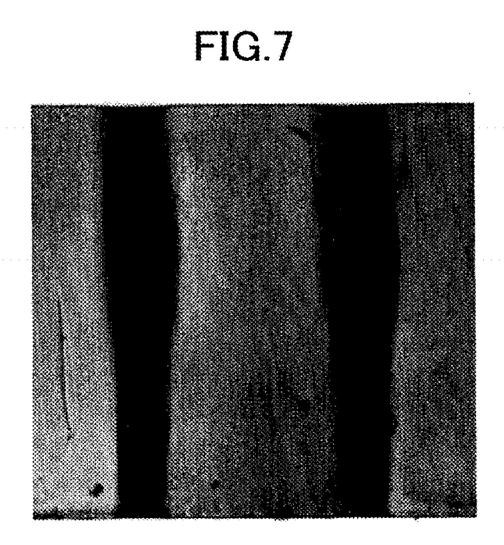
FIG. 7 is a diagram showing a photograph of a vertical cross-section of a typical through-hole that is obtained in Test Example 1.
Figure 8:
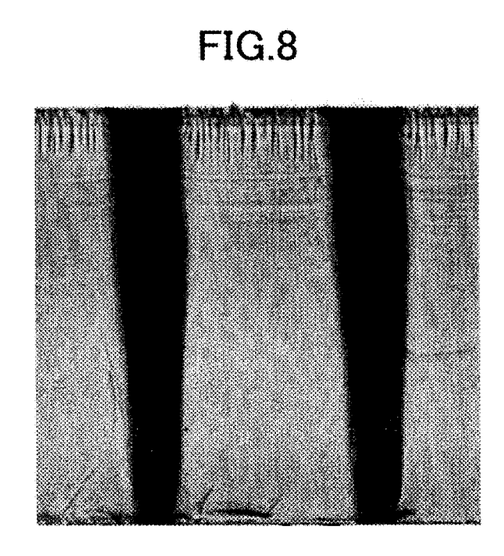
FIG. 8 is a diagram showing a photograph of a vertical cross-section of a typical through-hole that is obtained in Test Example 2.
Figure 9:
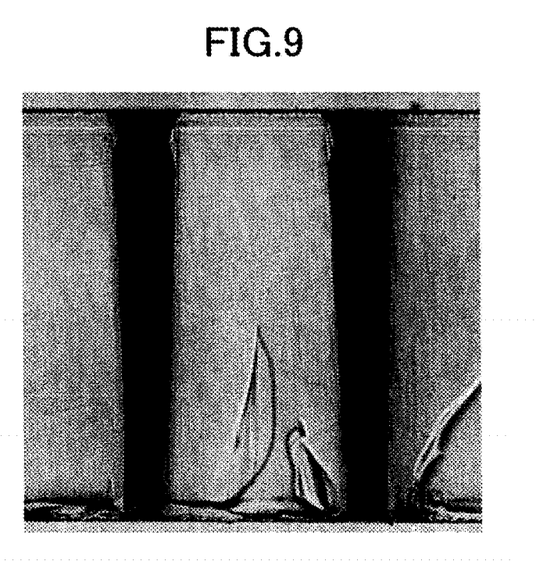
FIG. 9 is a diagram showing a photograph of a vertical cross-section of a typical through-hole that is obtained in Test Example 3.
Figure 10:
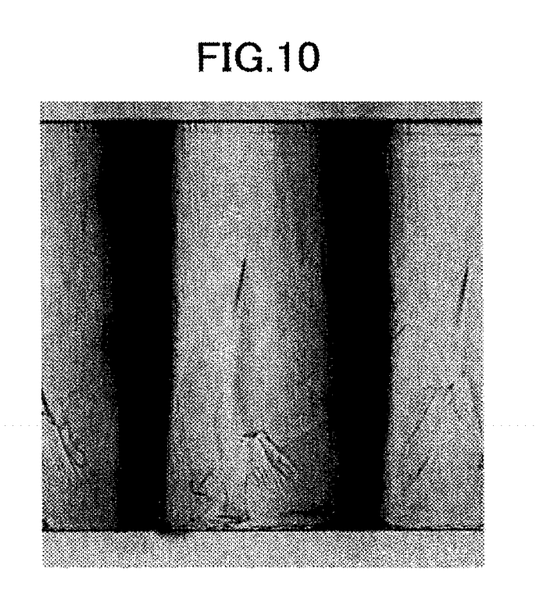
FIG. 10 is a diagram showing a photograph of a vertical cross-section of a typical through-hole that is obtained in Test Example 4.
Figure 11:
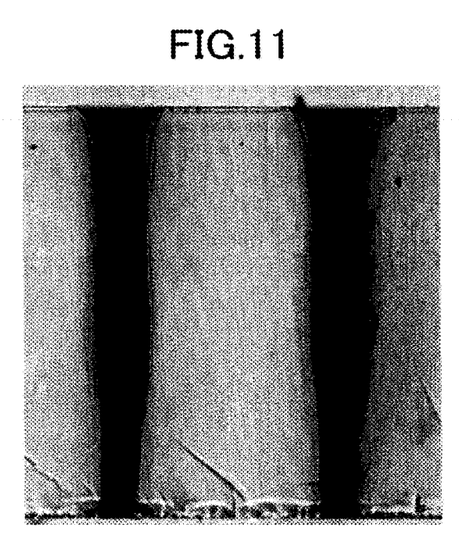
FIG. 11 is a diagram showing a photograph of a vertical cross-section of a typical through-hole that is obtained in Test Example 5.
Figure 12:
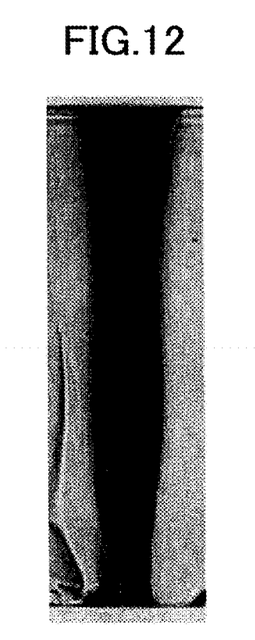
FIG. 12 is a diagram showing a photograph of a vertical cross-section of a typical through-hole that is obtained in Test Example 6.
Figure 13:
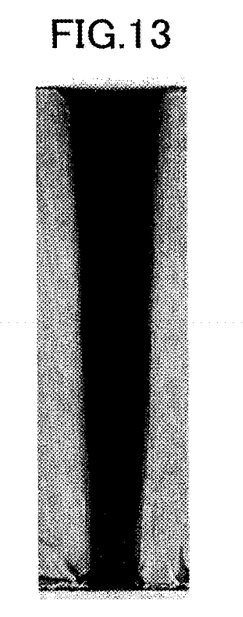
FIG. 13 is a diagram showing a photograph of a vertical cross-section of a typical through-hole that is obtained in Test Example 7.
Figure 14:
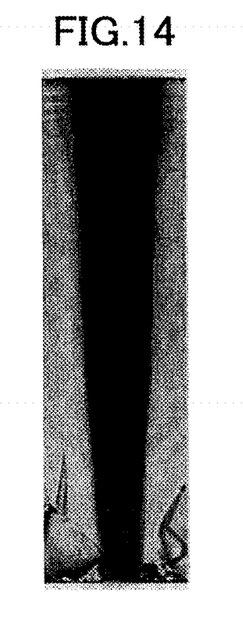
FIG. 14 is a diagram showing a photograph of a vertical cross-section of a typical through-hole that is obtained in Test Example 8.
Figure 15:
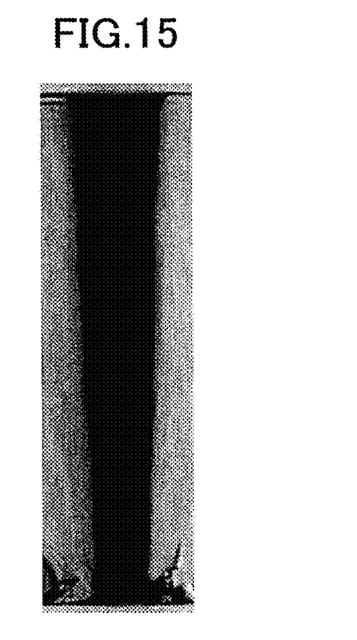
FIG. 15 is a diagram showing a photograph of a vertical cross-section of a typical through-hole that is obtained in Test Example 9.
Figure 16:
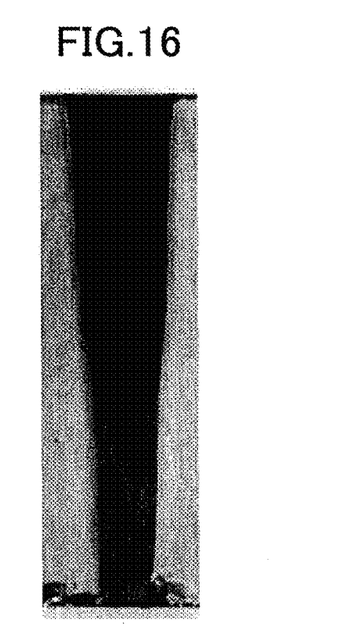
FIG. 16 is a diagram showing a photograph of a vertical cross-section of a typical through-hole that is obtained in Test Example 10.
Figure 17:
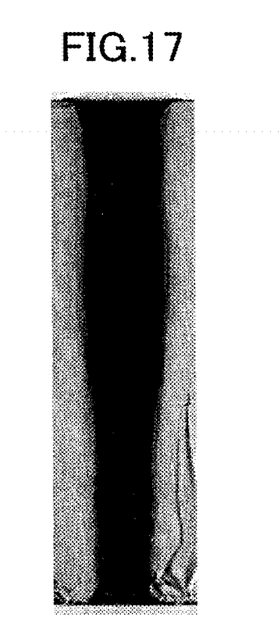
FIG. 17 is a diagram showing a photograph of a vertical cross-section of a typical through-hole that is obtained in Test Example 11.
Figure 18:
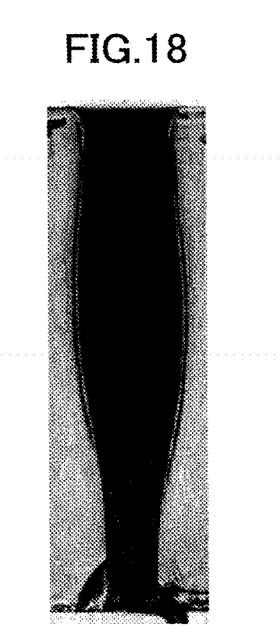
FIG. 18 is a diagram showing a photograph of a vertical cross-section of a typical through-hole that is obtained in Test Example 12.

FIG. 6 is a diagram showing the through-hole forming apparatus according to another embodiment of the present invention. The through-hole forming apparatus according to this embodiment is different from the through-hole forming apparatus according to the above-described embodiment in a point that the through-hole forming apparatus according to this embodiment may include a machining unit 50 for electrical discharge machining to form the through-hole 4. Hereinafter, the point of difference is mainly described.

The machining unit 50 can correct the shape of the through-hole 4 by applying electrical discharge machining to the through-hole 4 that may be obtained by laser processing. The ratio ($\Phi1/\Phi2$) at any position of the through-hole 4 in the thickness direction of the insulation substrate 2 can be adjusted to be within a range from 0.8 to 1.1 because a locally narrow part and so forth of the through-hole 4 can be removed.

The machining unit 50 may include the stage 12 as a first electrode; a second electrode 52; and a direct current (DC) high-voltage power supply 54.

The second electrode 52 can be formed to have a needle shape. An infinitesimal gap may be formed between the second electrode 52 and the insulation substrate 2 that is held by the stage 12. The second electrode 52 can be disposed outside the path of the laser beam 22, so that the second electrode 52 can avoid blocking the laser beam 22.

The DC current high-voltage power supply 54 can apply a direct-current voltage between the stage 12 and the second electrode 52 so as to cause an electric discharge in the through-hole 4.

The machining unit 50 according to the embodiment may include the stage 12 as the first electrode. Alternatively, the machining unit 50 may include a first electrode that is different from the stage 12. In this case, the first electrode may have a needle shape, similar to the second electrode 52.

Next, a through-hole forming method by using the above-described through-hole forming apparatus is described. The through-hole forming method may include a process of applying electrical discharge machining to the through-hole 4 by applying a DC voltage between the stage 12 and the second electrode 52 so as to cause an electric discharge in the through-hole 4. In order to enhance the throughput, a time period for waiting from the completion of laser processing until start of the electrical discharge machining can be less than or equal to 100 μs.

After applying the electrical discharge machining, a relative position, in the horizontal direction, between the stage 12 and the laser source 20, the optical system 30, and the second electrode 52 can be changed, and laser processing and electrical discharge machining can be executed again. In this manner, more than one through-holes 4 can be formed in the insulation substrate 2.

Note that, for changing the relative position, in the horizontal direction, between the stage 12 and the laser source 20, the optical system 30, and the second electrode 52, either the stage 12 or the laser source 20, the optical system 30, and the second electrode 52 may be moved. Alternatively, both the stage 12 and the laser source 20, the optical system 30, and the second electrode 52 may be moved.

Hereinafter, Test Examples 1 to 12 are described. The Test Examples 2 to 4 and 7 to 10 are according to the embodiment, and the Test Examples 1, 5, 6, 11, and 12 are according to the comparative example.

Test Examples 1 to 5

In the Test Examples 1 to 5, approximately ten thousand through-holes were formed in a glass substrate under substantially the same condition, except for changing sin θ by varying a diameter of an opening of the aperture 34 and changing a time period for irradiation, as shown in Table 1. For forming a through-hole, the through-hole forming apparatus that is shown in FIG. 1 was used. Note that, in the Test Example 5, the aperture 34 that is shown in FIG. 1 was not used, and a laser beam having a circular cross-section with a diameter of 15 mm directly entered the lens 36, as it was. In the Test Examples 1 to 5, the laser beam that entered the lens 36 was collimating light having a circular cross-section. In the Test Examples 1 to 5, electrical discharge machining was not executed.

First, major conditions that were common among the Test Examples 1 to 5 are described. An alkali-free glass substrate having a thickness of 0.4 mm was used as the glass substrate. A carbon dioxide laser was used as the laser source 20. The output power of the laser source 20 was set to 100 W. The laser beam 22 was irradiated onto the glass substrate so that the laser beam 22 was focused on the laser irradiated surface 2a of the glass substrate by the lens 36 having a focal length f of 25 mm. The medium between the lens 36 and the glass substrate was air.

The table 1 and FIGS. 7 to 11 show the results of the experiments. In FIGS. 7 to 11, the dark portions are the through-holes 4.

TABLE 1

| | Irradiation time period (μs) | Aperture opening diameter (mm) | sin θ | $\Phi1/\Phi2$ Minimum value | $\Phi1/\Phi2$ Maximum value |
|---|---|---|---|---|---|
| Test Example 1 | 500 | 6.0 | 0.12 | 0.54 | 1.19 |
| Test Example 2 | 420 | 8.0 | 0.16 | 0.70 | 1.07 |
| Test Example 3 | 345 | 10.0 | 0.20 | 0.81 | 1.02 |
| Test Example 4 | 310 | 11.0 | 0.22 | 0.74 | 1.06 |
| Test Example 5 | 280 | None | 0.29 | 0.72 | 1.22 |

As clearly seen from Table 1 and FIGS. 7 to 11, in the Test Examples 2 to 4, the ratio ($\Phi1/\Phi2$) was within a range from 0.7 to 1.1 because sin θ was in a range from 0.16 to 0.22, and consequently the through-holes 4 having the shapes that were close to the target shape could be formed. Whereas, in the Test Examples 1 and 5, the value of sin θ was out of the range from 0.16 to 0.22, and the collapse in the shapes was significant.

Test Examples 6 to 12

In the Test Examples 6 to 12, approximately ten thousand through-holes were formed in a glass substrate under substantially the same condition, except for changing sin θ by varying a diameter of an opening of the aperture 34 and changing a time period for irradiation, as shown in Table 2. For forming a through-hole, the through-hole forming apparatus that is shown in FIG. 6 was used. Note that, in the Test Example 12, the aperture 34 that is shown in FIG. 6 was not used, and a laser beam having a circular cross-section with a diameter of 15 mm directly entered the lens 36, as it was. In the Test Examples 6 to 12, the laser beam that entered the lens 36 was collimating light having a circular cross-section. In the Test Examples 6 to 12, electrical discharge machining was executed after laser processing.

First, major conditions that were common among the Test Examples 6 to 12 are described. An alkali-free glass substrate having a thickness of 0.4 mm was used as the glass substrate. A carbon dioxide laser was used as the laser source 20. The output power of the laser source 20 was set to 80 W. The laser beam 22 was irradiated onto the glass substrate so that the laser beam 22 was focused on the laser irradiated surface 2a of the glass substrate by the lens 36 having a focal length f of 25 mm. The medium between the lens 36 and the glass substrate was air.

The table 2 and FIGS. 12 to 18 show the results of the experiments. In FIGS. 12 to 18, the dark portions are the through-holes 4.

TABLE 2

| | Irradiation time period (μs) | Aperture opening diameter (mm) | sin θ | Φ1/Φ2 Minimum value | Φ1/Φ2 Maximum value |
|---|---|---|---|---|---|
| Test Example 6 | 460 | 7.0 | 0.14 | 0.67 | 1.14 |
| Test Example 7 | 420 | 8.0 | 0.16 | 0.83 | 1.00 |
| Test Example 8 | 380 | 9.0 | 0.18 | 0.86 | 1.00 |
| Test Example 9 | 345 | 10.0 | 0.20 | 0.83 | 1.00 |
| Test Example 10 | 310 | 11.0 | 0.22 | 0.84 | 1.00 |
| Test Example 11 | 300 | 13.0 | 0.24 | 0.77 | 1.12 |
| Test Example 12 | 280 | None | 0.29 | 1.00 | 1.31 |

As clearly seen from Table 2 and FIGS. 12 to 18, in the Test Examples 7 to 10, the ratio (Φ1/Φ2) was within a range from 0.8 to 1.1 because sin θ was in a range from 0.16 to 0.22, and consequently the through-holes 4 having the shapes that were close to the target shape could be formed. Whereas, in the Test Examples 6, 11 and 12, the value of sin θ was out of the range from 0.16 to 0.22, and the collapse in the shapes was significant.

The through-hole forming method, the through-hole forming apparatus, and the method of manufacturing a glass substrate provided with a through-hole are explained above by the embodiment. However, the present invention is not limited to the above-described embodiment, and various modifications and improvements can be made within the gist that is described in the scope of the claims.

What is claimed is:

1. A through hole forming method comprising:
   a process of forming, by condensing and irradiating a laser beam from a carbon dioxide laser onto an insulation substrate through a lens, a through-hole that passes through the insulation substrate in a thickness direction of the insulation substrate,
   wherein a medium between the lens and the insulation substrate is air, and
   wherein a converging half angle θ that is calculated from a focal length f of the lens and a beam diameter d of the laser beam that enters the lens by using expression (1) satisfies expression (2):

$$(d/2)/f = \tan \theta \quad (1), \text{ and}$$

$$0.16 \leq \sin \theta \leq 0.22 \quad (2).$$

2. The through-hole forming method according to claim 1, wherein the laser beam that enters the lens is collimating light having a circular cross-section.

3. The through-hole forming method according to claim 1, wherein a distance between a focal point of the lens and a laser irradiated surface of the insulation substrate in a direction that is perpendicular to the irradiated surface is less than or equal to 0.1 mm.

4. The through-hole forming method according to claim 1, wherein the through-hole has a first orifice at a laser irradiated surface of the insulation substrate, and a second orifice at a surface that is opposite to the laser irradiated surface of the insulation substrate,
   wherein the second orifice is smaller than the first orifice, and
   wherein a ratio (Φ1/Φ2), at any position of the through-hole in the thickness direction of the insulation substrate, between a diameter (Φ1) of the through-hole and a diameter (Φ2) of a truncated cone, a side surface of the truncated cone including the first orifice and the second orifice, is greater than or equal to 0.7 and less than or equal to 1.1.

5. The through-hole forming method according to claim 1, wherein the laser beam enters the lens through an aperture.

6. The through-hole forming method according to claim wherein polarization of the laser beam is converted from linear polarization to circular polarization, and the circularly polarized laser beam is irradiated onto the insulation substrate.

7. The through-hole forming method according to claim 1, wherein the insulation substrate includes a glass substrate.

8. The through-hole forming method according to claim 1, further comprising:
   a process of applying electrical discharge machining to the through-hole.

9. The through-hole forming method according to claim 1, wherein $$0.17 \leq \sin \theta \leq 0.21.$$

10. The through-hole forming method according to claim 1, wherein $$0.18 \leq \sin \theta \leq 0.20.$$

11. A method of manufacturing a glass substrate provided with a through-hole, the method comprising:

a process of forming, by condensing and irradiating a laser beam from a carbon dioxide laser onto a glass substrate through a lens, a through-hole that passes through the glass substrate in a thickness direction of the glass substrate, wherein a medium between the lens and the glass substrate is air, and wherein a converging half angle θ that is calculated from a focal length f of the lens and a beam diameter d of the laser beam that enters the lens by using expression (1) satisfies expression (2):

$$(d/2)/f = \tan\theta \quad (1), \text{ and}$$

$$0.16 \leq \sin\theta \leq 0.22 \quad (2).$$

12. A through-hole forming method comprising:

a process of forming, by condensing and irradiating a laser beam from a carbon dioxide laser onto a glass insulation substrate through a lens, a through-hole that passes through the glass insulation substrate in a thickness direction of the glass insulation substrate, wherein a medium between the lens and the glass insulation substrate is air, and wherein a converging half angle θ that is calculated from a focal length f of the lens and a beam diameter d of the laser beam that enters the lens by using expression (1) satisfies expression (2):

$$(d/2)/f = \tan\theta \quad (1), \text{ and}$$

$$0.16 \leq \sin\theta \leq 0.22 \quad (2).$$

13. The through-hole forming method according to claim 12, wherein $$0.17 \leq \sin\theta \leq 0.21.$$

14. The through-hole forming method according to claim 12, wherein $$0.18 \leq \sin\theta \leq 0.20.$$

* * * * *